United States Patent

Hoy

(10) Patent No.: US 6,906,010 B2
(45) Date of Patent: Jun. 14, 2005

(54) ADDITIVES FOR PREPARING RHEOLOGY-MODIFIED AQUEOUS FLUIDS

(76) Inventor: Edgar Franklin Hoy, 3906 Rock Springs Dr., Kingwood, TX (US) 77345

( * ) Notice: Subject to any disclaimer, the term of this patent is extended or adjusted under 35 U.S.C. 154(b) by 22 days.

(21) Appl. No.: 10/419,769

(22) Filed: Apr. 21, 2003

(65) Prior Publication Data

US 2003/0232727 A1 Dec. 18, 2003

Related U.S. Application Data

(60) Provisional application No. 60/374,319, filed on Apr. 22, 2002.

(51) Int. Cl.$^7$ ............................. C09K 7/02; B01J 13/00
(52) U.S. Cl. ...................... 507/140; 507/145; 507/269; 507/277; 516/110
(58) Field of Search ................. 507/140, 145, 507/269, 277; 516/110

(56) References Cited

U.S. PATENT DOCUMENTS

| | | | | |
|---|---|---|---|---|
| 3,185,642 A | * | 5/1965 | Sawyer, Jr. et al. | 507/140 |
| 4,318,732 A | * | 3/1982 | Sawyer, Jr. | 71/64.08 |
| 5,232,627 A | * | 8/1993 | Burba et al. | 516/110 |
| 5,532,212 A | * | 7/1996 | Patel | 507/140 |
| 5,658,859 A | * | 8/1997 | Burba et al. | 507/111 |
| 5,721,198 A | * | 2/1998 | Burba et al. | 507/140 |
| 6,025,303 A | * | 2/2000 | Keilhofer et al. | 507/140 |
| 6,365,639 B1 | * | 4/2002 | Hoy | 516/110 |

* cited by examiner

*Primary Examiner*—Philip C. Tucker
(74) *Attorney, Agent, or Firm*—Barbara J. Tribble

(57) ABSTRACT

A rheology modified aqueous fluid composition comprising clay, water, magnesium oxide, aluminum oxide hydroxide, sodium carbonate or potassium carbonate, and calcium oxide or calcium hydroxide. The magnesium oxide and aluminum oxide hydroxide are prepared by a specific thermal treatment protocol involving heating of appropriate precursors within a specified temperature range. The pH of the composition is at least about 10. The composition is prepared by admixing the components and, optionally, sodium oxide or sodium hydroxide for pH adjustment as necessary. A substantially dry rheology modification agent comprising the enumerated components, not including the water, is also included. The resulting composition preferably exhibits shear-thinning capability including very rapid thinning upon application of shear forces and also rapid viscosification upon removal of such forces.

20 Claims, No Drawings

ADDITIVES FOR PREPARING RHEOLOGY-MODIFIED AQUEOUS FLUIDS

CROSS REFERENCE TO A RELATED APPLICATION

This is a non-provisional Patent Application claiming priority to provisional Patent Application Ser. No. 60/374,319, filed Apr. 22, 2002, currently pending.

BACKGROUND OF THE INVENTION

1. Field of the Invention

This invention relates to the field of rheology modification agents for use in fluids such as drilling, mining and milling fluids, including but not limited to those used in natural resources exploration, utility horizontal directional boring, and environmental remedial wells.

2. Background Art

The use of rheology modification agents, frequently thixotropic agents, for aqueous fluids has been common practice in a large number of industries. These fluids include, for example, oil field drilling fluids, metal-working fluids, mining fluids, fire control fluids, agricultural organic formulations, water-based paints and coating fluids, stripping fluids, and the like. For each of these, and other, applications, the rheology modification agents serve very specific purposes tailored to the function for which the fluid is being employed. Because a variety of properties are frequently needed for a given fluid, the rheology modification agent is frequently used in conjunction with other types of agents or additives, in order to produce a final fluid suitable to a given application. However, it is generally desirable to reduce the number of such agents or additives as much as possible, in order to facilitate the ease of production and use and therefore to also minimize cost.

Certain inorganic materials, including mineral clays such as bentonite and attapulgite, are commonly used for rheology modification of aqueous fluids. For example, bentonite, which is one of the most popular of the clay materials for use in drilling muds, is thixotropic in combination with water and is also relatively stable to temperature extremes. Furthermore, it imparts resistance to oxidation and durability when exposed to high shear conditions. These clays may be used with other types of agents or densifiers, such as iron oxide or barium sulfate, which enhance the ability of the fluid to resist pressures such as are encountered in subterranean excavations.

Aqueous fluids containing only clays for rheology modification suffer problems, however, including compromise in the presence of polyvalent cations, such as calcium and magnesium. These cations are frequently present in drilling formations and can cause the drilling mud to become so thick at higher temperatures that thinners may be required. Some clay systems also suffer from undesirable reactivity and temperature degradation, and may not be adequately consistent in composition from batch to batch.

Combinations of clays and polymeric materials have been employed in attempts to counter deficiencies in simple clay/water systems and also to extend the clay. Typical extenders useful with bentonite systems include polyacrylamide and polyacrylic acid. However, combining clays with polymeric materials increases the complexity of the composition and, therefore, its cost and/or difficulty of preparation, particularly under field conditions. Also unfortunately, the weaknesses of the extending polymer, such as thermal instability, may then dominate the characteristics of the fluid as a whole.

For some applications it is particularly desirable to use a rheology modification agent which exhibits the ability to "shear-thin", i.e., to show a rapid or near-instantaneous and predictable viscosity reduction upon application of shear forces, followed by a rapid or near-instantaneous return to original viscosity when the shear forces are removed. Clays alone may effectively thicken a composition, but generally do not offer this shear-thinning capability. While there are newer rheology modification agents that do offer shear-thinning capability, they tend to be much more expensive than clay and may be more difficult to employ under typical field conditions.

It would therefore be highly useful to identify a clay-based rheology modification agent for use with an aqueous fluid which takes advantage of the relatively low-cost thixotropy of clay, yet offers shear-thinning capability; which is not cost-prohibitive for large scale application; and which does not undesirably interfere with other commonly-sought properties of the fluid.

SUMMARY OF THE INVENTION

Accordingly, the present invention is a shear-thinning, clay-based rheology modified composition comprising clay, water, magnesium oxide, aluminum oxide hydroxide, sodium carbonate or potassium carbonate, and calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight; wherein the pH of the composition is at least about 10. Optionally, sodium hydroxide or sodium oxide can be added for pH adjustment.

In another embodiment the present invention is a substantially dry rheology modification agent, suitable for use in an aqueous fluid, comprising clay, magnesium oxide, aluminum oxide hydroxide, sodium carbonate or potassium carbonate, calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight; and, optionally, sodium hydroxide or sodium oxide.

In still another embodiment the present invention is a method of preparing a rheology modified aqueous fluid composition comprising admixing clay, water, magnesium oxide, aluminum oxide hydroxide, sodium carbonate or potassium carbonate, and calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight; and further provided that the pH of the composition is at least about 10.

DESCRIPTION OF THE INVENTION

The present invention provides a novel family of compositions which can be classified generally as combinations of a clay-based rheology modification agent and an aqueous fluid. The "rheology modification agent" as defined comprises clay, but the clay may be included with the other agent components as a package, or may be combined separately and directly with the water; or each of the components (including the clay) may be separately admixed with the aqueous fluid to form the rheology modified composition of the present invention in situ. Because each of the components of the rheology modification agent is relatively inexpensive, the resulting rheology modified compositions can be employed in a wide range of applications. A particular advantage of the present invention is that use of the rheology modification agent in an aqueous fluid results in a rheology modified composition which exhibits shear-thinning, i.e., the ability to significantly diminish in rheology upon application of shear forces, but to "gel" rapidly upon removal of such shear forces, which operates to effectively suspend solids. This ability to "gel" rapidly, using the term "gel" colloquially and without reference to the precise nature of the chemical and/or ionic bonding and/or composition of the material, is particularly important for applications such as drilling and mining, where solids suspension is critical in maintaining the integrity of the excavation during work stoppages and where pumpability must be easily reinitiated in order to ensure restarts.

Those skilled in the art will understand that the term "drilling" is used herein in its broadest meaning. As such it includes not only the field of exploitation of geological deposits such as petroleum, natural gas, steam and superheated water (so-called "geothermal" drilling), but also any technical accessory drilling, including but not limited to tunneling, so-called "river crossing", the sealing of dump sites, water well drilling, construction applications such as horizontal directional drilling in general, and the like.

The first necessary component in the present invention's rheology modification agent is the clay. Such clay is preferably a smectitic clay of any type. Preferred clays include bentonite, chlorite, polygorskite, saconite, vermiculite, halloysite, sepiolite, illite, kaolinite, attapulgite, montmorillonite, Fuller's earth, mixtures thereof, and the like. Such are commercially available from a wide variety of sources and are relatively inexpensive.

The second component (without reference to order of mixing) is a magnesium oxide that is prepared by, i.e., results from, thermal treatment of an appropriate precursor. Such precursor can be, for example, magnesium oxide itself, magnesium carbonate, magnesium hydroxide, magnesium nitrate, or a combination thereof. Such precursors are available from a number of commercial sources, but generally the thermal treatment must be carried out as a separate step, either by the precursor producer or by a secondary contractor. "Thermal treatment" is defined herein as heating to a temperature of from about 500° C. to about 900° C., preferably for at least about 0.25 hour, and more preferably from about 700° C. to about 850° C. for at least about 0.5 hour. Thermal treatment is considered to be complete when loss on ignition (LOI), as tested according to ASTM D2773-94, at 1000° C. for 1 hour, is determined to be less than about 3 percent by weight. Those skilled in the art will be easily able to determine, via routine experimentation, optimum times and temperatures to achieve the required LOI. The skilled artisan will also know that increases in time, temperature, or both can be employed when a given material has been shown to not reach the required LOI under given test conditions. It should also be noted, however, that so-called "dead-burned" magnesium oxide (i.e., heated to a temperature and/or time such that it has become inert) is strictly proscribed herein. "Thermal treatment," as defined, can be done using methods and means known to those skilled in the art, but usually rotary kilns or muffle kilns are effective means, with heating ramped from ambient to peak temperature and back again over a period of at least about 0.25 hour and preferably longer to achieve the desired LOI test result.

A third component (without reference to order of mixing) is an aluminum oxide hydroxide which is produced via thermal treatment of an appropriate precursor. Such precursors may include aluminum oxide hydroxide (pseudoboehmite or bayrite) itself, or aluminum trihydroxide (boehmite), or alternatively aluminum carbonate or aluminum nitrate, or a combination thereof. As with the magnesium oxide component, the precursors for the aluminum oxide hydroxide component are commercially available from a variety of sources. Thermal treatment of a selected aluminum oxide hydroxide precursor mirrors the options available for treatment of the magnesium oxide precursors, but time is preferably somewhat longer, from about 0.5 to about 0.75 hour. Determination that such thermal treatment to prepare the aluminum oxide hydroxide is completed can again be accomplished by measuring the loss on ignition (LOI), using methodology known to those skilled in the art at 1000° C. Again, it is considered to be complete for purposes of the present invention when it is less than 3 percent by weight. In fact, for the sake of convenience the precursors for both the magnesium oxide and the aluminum oxide hydroxide can be treated together for a period of preferably from about 0.3 to about 0.6 hour, using a temperature of preferably from about 500° C. to about 900° C., until the specified LOI is accomplished.

The fourth component (without reference to order of mixing) is a carbonate, which may include, as its cation, sodium or potassium. Sodium carbonate itself is preferred for reasons of cost and easy availability, but potassium carbonate is also efficacious.

The fifth component (without reference to order of mixing) is calcium hydroxide. Alternatives include calcium oxide, but calcium hydroxide is preferred because of its greater reactivity when used in the present invention.

Finally, the last, and optional, component (without reference to order of mixing) of the rheology modification agent of the present invention is a base selected from sodium hydroxide and sodium oxide. This component can be included where it is necessary to raise the pH of the final aqueous fluid composition to at least about 10, preferably from about 10 to about 12. In some cases the selected clay and other components may provide sufficient basicity such that this component is not needed; however, in most cases at least a small amount of sodium hydroxide and/or sodium oxide is needed to effect the desired pH level. Attainment of this pH operates to more rapidly initiate the thixotropic and shear-thinning effect.

While some adjustment of the proportions of the enumerated components is contemplated hereby, it is generally preferred that the components be incorporated within the following weight percentages, based on the weight of the aqueous fluid.

Clay is preferably employed in a range of from about 0.2, more preferably from about 0.5, and most preferably from about 1, to about 15, more preferably to about 10, and most preferably to about 4 percent, based on the weight of the aqueous fluid composition. Thus, the clay is preferably present in the minimum concentration which desirably increases the viscosity of the fluid.

The magnesium oxide resulting from thermal treatment is preferably employed in a range from about 0.04, more preferably 0.05, to about 5.0, more preferably to about 0.08, still more preferably to about 0.06 percent, based on the weight of the aqueous fluid. Most preferred is about 0.057 weight percent.

The aluminum oxide hydroxide prepared by thermal treatment is preferably from about 0.02 to about 5.0, more preferably to about 0.04, still more preferably to about 0.03 percent, based on the weight of the aqueous fluid. Most preferred is about 0.028 weight percent.

The sodium carbonate or potassium carbonate is preferably from about 0.100 to about 3.0, more preferably to about 0.003, still more preferably to about 0.200 percent, based on the weight of the aqueous fluid. Most preferred is about 0.143 weight percent.

Calcium oxide or calcium hydroxide is preferably employed in an amount from about 0.05, more preferably from about 0.06, and most preferably from about 0.07, to about 2.0, more preferably to about 0.10, still more preferably to about 0.08 percent, based on the weight of the aqueous fluid. Most preferred is about 0.072 weight percent.

Sodium hydroxide or sodium oxide, where included for pH adjustment, is preferably employed in an amount from about 0.002 to about 0.005, more preferably to about 0.004 percent, based on the weight of the aqueous fluid. Most preferred is about 0.003 weight percent.

As already noted, order of mixing of the components is not considered to be critical. Preferably the clay is pre-hydrated, but such is not required. Where it is desired to use a substantially dry rheology modification agent comprising the selected rheology modification agent components except for the clay, such may be admixed using any well-known dry mixing methods and means. As used herein "substantially dry" means that the formulation is in a comminuted form, such as a powder, granules, or pellets, suitable for shipping in bags, and that any waters of hydration that may be found in the chemistry thereof and/or any small amounts of moisture, which may result from, for example, exposure to humidity, are discounted from consideration. Optimization of mixing via any known mechanical means, including for example use of impeller devices, rotational mixing, or other inducement of turbulence, is desirable to ensure consistency in performance. Order of mixing can also be modified according to selections, sources and needs at the preparation or use locations. It is also possible to premix the clay with some or all of the components; or simply to mix each component separately with the aqueous fluid to form the final rheology modified composition of the present invention in situ.

In preparing a substantially dry rheologoly modification agent of the present invention it is preferable that the selected clay be from about 75 to about 91 percent; the magnesium oxide from about 2 to about 8 percent; the aluminum oxide hydroxide from about 1 to about 4 percent; the sodium carbonate or potassium carbonate from about 4 to about 9 percent; and the calcium oxide or calcium hydroxide from about 2 to about 8 percent. These percentages are based upon the weight of the agent as a whole.

Other additives may also be included in either a substantially dry package with the rheology modification agent of the present invention (if available in dry form), or in the final rheology modified aqueous fluid composition. Such could include, for example, materials intended to modify lubricity, corrosion resistance, resistance to geological pressure, and the like. In some cases such additional materials may also have limited effect on rheological performance which may be desirable and/or which should be appropriately taken into account. Additional additives may also include fluid loss additives, such as starch, carboxymethylated starch and/or modified polysaccharides; weighting agents, such as calcium carbonate, barium sulfate, and/or magnetite ($Fe_3O_4$); gas hydrate modifiers, such as glycol and glycerine; corrosion inhibition agents, such as quaternary halides, especially bromides; and the like.

While the present invention has been shown to be usually effective at temperatures up to about 200° F., it may in some instances tend to perform less well at higher temperatures. Enhanced temperature stability can be obtained by including, as another component of either the substantially dry rheology modification agent or of the rheology modified aqueous fluid composition, a small amount of urea or another nitrogen-containing compound such as ethylene amide, propylene amide, mixtures thereof, and the like. Of these, urea is preferred because of its usually low cost and convenience. When employed, the urea is preferably in an amount of from about 0.05, more preferably from about 0.075, to about 2.0, more preferably to about 0.2, still more preferably to about 0.15, and most preferably to about 0.09 percent, based on the weight of the aqueous fluid composition. The inclusion of such a compound substantially enhances the ability of the final rheology modified aqueous fluid composition to maintain the desired rheological properties despite exposure to temperatures of 275° F. or even higher.

Where a dry package, suitable for shipping and storage, is desired, it may be appropriate in some cases to limit time of exposure to air. This limitation is desirable due to the inherently hygroscopic nature of some of the components of the present invention and also of some possible additional additives.

In partial summary, it will be noted that, because of the variety of mixing options represented hereinabove, it is possible to prepare a substantially dry composition, suitable for shipping, storage and/or later hydration; a fluid (liquid) composition, particularly suited to small scale batching; or a fluid (liquid) composition prepared in situ, such as would be encountered when either the substantially dry composition or a small scale liquid composition is added to a much larger liquid environment, such as that encountered in a drilling rig mud pit. The final result, using any of these compositions, will preferably be a viscosified and shear-thinning fluid composition which can be effectively used at a temperature preferably up to at least about 200° F., or, where a nitrogen-containing compound such as urea is also included, up to at least about 275° F. It is preferred that initial viscosification occurs within about 30 minutes from mixing of all components, including pH adjustment where needed; more preferably within about 20 minutes; and most preferably within about 15 minutes.

In addition to their predetermined maximum viscosity, which is preferably a "gelled" elastic solid phase, the compositions of the present invention may also preferably exhibit desirable shear-thinning, which is also termed "stress-dependent fluidity". In general, the reduction in viscosity upon stress application can be graphically predicted, with the relationship between viscosity (defined in centipoise) being substantially linear when plotted against shear rate (defined as $sec^{-1}$, which is a log scale). In the case of such "gelled" elastic solid phase fluids, under conditions of actual use the phase transition from elastic solid to true fluid under shear conditions is preferably rapid, more preferably within about 2 minutes, most preferably effectively instantaneous. It is also preferred that the return to the viscosified elastic solid, or "gelled" state, occurs preferably within about 10 minutes, more preferably within about 5 minutes, and most preferably within about 0.5 minute. This last quality enables the composition to suspend drill, mill and mining solids particularly well upon cessation of shear forces such as those exerted by drill bits or during pumping. The resultant composition is furthermore preferably durable, exhibiting no or reduced reduction in its ability to make such rapid viscosity transitions upon intermittent and repeated applications of shear and in a wide variety of environments.

Determination of the degree of modification of rheology can be carried out experimentally onsite, but preferably such can be accomplished beforehand via use of an analytical method. The most commonly used methodology is described in detail in *Manual of Drilling Fluids Technology*, 1985, NL Baroid/NL Industries Inc., whereby a yield point may be obtained using a Fann 35 rheometer.

It is interesting to note that the components of the present invention can still be each individually identified upon appropriate molecular analysis following formation of the rheology modified aqueous fluid composition. Such analysis can include X-ray diffraction (if crystalline); titration metal analysis; nuclear magnetic resonance-mass spectroscopy; infrared spectroscopy; and other standard molecular analyses.

These and other properties of the present invention will be further illustrated via the following example, which is intended for illustrative purposes only and is not meant to limit, nor should it be construed as limiting, the scope of the invention in any way.

EXAMPLE 1

About 70 g of bentonite (GOLD SEAL*, a trademark of Baroid, Inc.) is added in a pre-hydration step to about 3,430 g water and mixed for 16 hours to produce a 2 percent by weight clay slurry. The yield point for this slurry is measured and found to be about 2.

About 350 g of this clay slurry is charged in a Hamilton Beach mixer running at medium speed. To this slurry is added a mixture of 0.25 g magnesium oxide (resulting from thermal treatment according to the present invention of an appropriate precursor); 0.25 g of aluminum oxide hydroxide (resulting from thermal treatment according to the present invention of an appropriate precursor); 0.25 g calcium hydroxide, 0.5 g sodium carbonate; and 0.04 g sodium hydroxide. Testing using a Fann 35 rheometer (direct dial read-out) reveals the following results:

| Yield Point | Time |
| --- | --- |
| 21 | 20 minutes |
| 22 | 1 hour |
| 20 | 2 hours |
| 24 | 4 hours |

COMPARATIVE EXAMPLE A

The procedure of Example 1 is followed to prepare a 2 percent by weight clay slurry which is then charged in a Hamilton Beach mixer running at medium speed. To about 350 g of this slurry is added about 1 g of magnesium hydroxide which has been pretreated by heating to a temperature of about 105° C. for a period of about 2 hours. The mixture is allowed to sit at ambient temperature for one hour and found upon visual examination to exhibit no significant thickening. It is observed again after about eight hours and found to exhibit significant thickening.

COMPARATIVE EXAMPLE B

A 2 percent by weight clay slurry is prepared as in Example 1 and then about 1 g of calcium hydroxide is added to about 350 g of this clay slurry and mixed at ambient temperature. Yield point tests exhibit the following results:

| Yield Point | Time |
| --- | --- |
| 4 | 20 minutes |
| 11 | 2 hours |
| 31 | 4 hours |
| 35 | 16 hours |

COMPARATIVE EXAMPLE C

A 2 percent by weight clay slurry is prepared as in Example 1 and then about 1 g of magnesium hydroxide, which has been thermally treated according to the present invention to form magnesium oxide, is added to about 350 g of this clay slurry and mixed at ambient temperature under the same mixing conditions as in the previous example. Yield point tests exhibit the following results:

| Yield Point | Time |
| --- | --- |
| 2 | 20 minutes |
| 4 | 2 hours |
| 5 | 4 hours |
| 16 | 16 hours |
| 27 | 32 hours |

COMPARATIVE EXAMPLE D

The procedure of Comparative Example C is carried out, except that magnesium oxide which has been heated at 900° C. for about 30 minutes is substituted for the magnesium oxide used in Comparative Example C. Testing reveals the following results:

| Yield Point | Time |
| --- | --- |
| 4 | 20 minutes |
| 12 | 2 hours |
| 27 | 4 hours |
| 26 | 16 hours |
| 29 | 32 hours |

COMPARATIVE EXAMPLE E

The procedure of Comparative Example D is carried out, except that the magnesium oxide is pretreated by heating at 1500° C. for about 30 minutes. Tests reveal the following results:

| Yield Point | Time |
| --- | --- |
| 2 | 20 minutes |
| 2 | 2 hours |
| 3 | 4 hours |
| 2 | 16 hours |
| 6 | 32 hours |

COMPARATIVE EXAMPLE F

The procedure of Example 1 is carried out except that the materials added to the 350 g clay slurry are about 0.5 g of magnesium oxide (pretreated at a temperature of about 900° C.) and about 0.5 g of calcium oxide (which has not been pretreated). Results are as follows:

| Yield Point | Time |
| --- | --- |
| 5 | 20 minutes |
| 17 | 2 hours |
| 28 | 4 hours |
| 29 | 16 hours |

COMPARATIVE EXAMPLE G

The procedure of Comparative Example F is carried out except that an additional material is added, which is 1 g of soda ash (sodium carbonate, $Na_2CO_3$). Results are as follows:

| Yield Point | Time |
| --- | --- |
| 6 | 20 minutes |
| 12 | 1 hours |
| 20 | 2 hours |
| 30 | 4 hours |

COMPARATIVE EXAMPLE H

The procedure of Comparative Example G is carried out except that an additional material is added, which is 0.5 g of aluminum trihydroxide. Results are as follows:

| Yield Point | Time |
| --- | --- |
| 4 | 20 minutes |
| 10 | 1 hours |
| 15 | 2 hours |
| 20 | 4 hours |
| 26 | 32 hours |

COMPARATIVE EXAMPLE I

The procedure of Example 1 is carried out except that about 0.25 g of $Al_2O_3$ that has been pretreated at 1500° C. is used instead of the AlO(OH). All other components are the same as in Example 1. Results are as follows:

| Yield Point | Time |
| --- | --- |
| 3 | 20 minutes |
| 9 | 2 hours |
| 12 | 4 hours |
| 20 | 16 hours |

EXAMPLE 2

The procedure of Example 1 is carried out except that about 0.5 g of aluminum oxide hydroxide which has pre pared by heating aluminum trihydroxide to about 700° C. for about 30 minutes is added. Results are as follows:

| Yield Point | Time |
| --- | --- |
| 22 | 20 minutes |
| 24 | 1 hours |
| 23 | 2 hours |
| 25 | 4 hours |

EXAMPLE 3

The procedure of Example 1 is carried out, except that the following materials added to the clay slurry are 0.25 g of magnesium oxide (resulting from heating magnesium hydroxide at 900° C. for 30 minutes); 0.5 g calcium oxide; 0.5 g aluminum oxide hydroxide (resulting from heating aluminum trihydroxide at about 700° C. for 30 minutes); 0.5 g sodium carbonate; and 0.04 g sodium hydroxide. Rheology was tested after 20 minutes using a Fann 35 rheometer and found to be as follows:

| RPM* | Dial reading |
| --- | --- |
| 600 | 26 |
| 300 | 24 |
| 6 | 16 |
| 3 | 14 |

*revolutions per minute, equals shear rate

The results indicate a calculated yield point of 22 and a plastic viscosity of 2. This fluid is then hot-rolled at 275° F. for 16 hours, and its rheology was rested with the following results:

| RPM | Dial reading |
| --- | --- |
| 600 | 4 |
| 300 | 3 |
| 6 | 1 |
| 3 | 1 |

The results indicate a calculated yield point of 2 and a plastic viscosity of 1.

EXAMPLE 4

The aqueous fluid composition of Example 2 is subjected to rheological testing with the following results, 20 minutes after completing the mixture:

| RPM | Dial reading |
| --- | --- |
| 600 | 27 |
| 300 | 25 |
| 6 | 11 |
| 3 | 11 |

The calculated yield point is 23 and the plastic viscosity is 2. This fluid is then hot-rolled at 275° F. for 16 hours and its rheology retested with the following results:

| RPM | Dial reading |
|---|---|
| 600 | 3 |
| 300 | 1 |
| 6 | 1 |
| 3 | 1 |

EXAMPLE 5

The procedure of Example 3 is repeated, except that 0.33 g of urea is also added and mixed for an additional 10 minutes. Rheological testing reveals the following results:

| RPM | Dial reading |
|---|---|
| 600 | 27 |
| 300 | 24 |
| 6 | 14 |
| 3 | 12 |

Calculated yield point is 21 and plastic viscosity is 3. The aqueous fluid composition is then hot-rolled for 16 hours at 275° F. and the rheology is retested as follows:

| RPM | Dial reading |
|---|---|
| 600 | 26 |
| 300 | 22 |
| 6 | 12 |
| 3 | 11 |

Calculated yield point is 18 and plastic viscosity is 4.

EXAMPLE 6

The procedure of Example 4 is repeated, except that 0.33 g of urea is also added and mixing continued an additional 10 minutes. Rheological testing gives the following results:

| RPM | Dial reading |
|---|---|
| 600 | 28 |
| 300 | 24 |
| 6 | 13 |
| 3 | 12 |

Calculated yield point is 20 and plastic viscosity is 4. The material is then hot-rolled for 16 hours at 275° F. and the rheology retested as follows:

| RPM | Dial reading |
|---|---|
| 600 | 25 |
| 300 | 22 |
| 6 | 14 |
| 3 | 12 |

Calculated yield point is 19 and plastic viscosity is 3.

In the foregoing specification, the invention has been described with reference to specific embodiments thereof, and has been demonstrated as particularly effective in preparing additives for use in drilling, milling and mining fluids. However, it will be evident that various modifications and changes can be made to the steps and components used in the method without departing from the broader spirit or scope of the invention as set forth in the appended claims. Accordingly, the specification is to be regarded in an illustrative rather than a restrictive sense. Thus, specific combinations of selected precursors and of starting materials to form the substantially dry rheology modification agent or the rheology modified aqueous fluid compositions, and specific mixing orders, protocols, and means, falling within the claimed parameters but not specifically identified or tried, are anticipated and expected to be within the scope of this invention.

I claim:

1. A rheology modified aqueous fluid composition comprising clay, water, magnesium oxide, aluminum oxide hydroxide, sodium carbonate or potassium carbonate, and calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight; wherein the pH of the composition is at least about 10.

2. The composition of claim 1 wherein the heating of appropriate precursors is at a temperature of from about 700° C. to about 850° C.

3. The composition of claim 1 wherein the clay is selected from the group consisting of bentonite, chlorite, polygorskite, saconite, vermiculite, halloysite, sepiolite, illite, kaolinite, attapulgite, montmorillonite, Fuller's earth, and mixtures thereof.

4. The composition of claim 1 wherein the clay is from about 0.2 to about 15 percent; the magnesium oxide is from about 0.04 to about 5.0 percent; the aluminum oxide hydroxide is from about 0.2 to about 4.0 percent; the sodium carbonate or potassium carbonate is from about 0.100 to about 3.0 percent; and the calcium oxide or calcium hydroxide is from about 0.05 to about 2.0 percent, based on the weight of the composition.

5. The composition of claim 1 further comprising sodium hydroxide or sodium oxide.

6. The composition of claim 1 further comprising a nitrogen-containing compound.

7. The composition of claim 6 wherein the nitrogen-containing compound is from about 0.05 to about 2.0 percent, based on the weight of the composition.

8. A substantially dry rheology modification agent comprising clay, magnesium oxide, aluminum oxide hydroxide, sodium carbonate or potassium carbonate, calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight.

9. The agent of claim 8 wherein the clay is selected from the group consisting of bentonite, chlorite, polygorskite, saconite, vermiculite, halloysite, sepiolite, illite, kaolinite, attapulgite, montmorillonite, Fuller's earth, and mixtures thereof.

10. The agent of claim 8 wherein the clay is from about 75 to about 91 percent; the magnesium oxide from about 2 to about 8 percent; the aluminum oxide hydroxide from about 1 to about 4 percent; the sodium carbonate or potassium carbonate from about 4 to about 9 percent; and the calcium oxide or calcium hydroxide from about 2 to about 8 percent, based upon the weight of the agent.

11. The agent of claim 8 further comprising sodium hydroxide or sodium oxide.

12. The agent of claim 8 wherein the heating of appropriate precursors is at a temperature of from about 700° C. to about 850° C.

13. The agent of claim 10 further comprising from about 0.05 to about 2.0 percent, by weight, of a nitrogen-containing compound.

14. A method of preparing a rheology modified aqueous fluid composition comprising admixing clay, water, magnesium oxide, aluminum oxide hydroxide, sodium carbonate or potassium carbonate, and calcium oxide or calcium hydroxide; provided that the magnesium oxide and aluminum oxide hydroxide result from heating of appropriate precursors to a temperature of from about 500° C. to about 900° C. such that each exhibits a loss on ignition (LOI) test result at 1000° C. for 1 hour of less than about 3 percent by weight; and further provided that the pH of the composition is at least about 10.

15. The method of claim 14 wherein the heating of appropriate precursors is at a temperature of from about 700° C. to about 850° C.

16. The method of claim 14 wherein the clay is selected from the group consisting of bentonite, chlorite, polygorskite, saconite, vermiculite, halloysite, sepiolite, illite, kaolinite, attapulgite, montmorillonite, Fuller's earth, and mixtures thereof.

17. The method of claim 14 wherein the clay is from about 0.2 to about 15 percent; the magnesium oxide is from about 0.4 to about 5.0 percent; the aluminum oxide hydroxide is from about 0.2 to about 5.0 percent; the sodium carbonate or potassium carbonate is from about 0.100 to about 0.300 percent; and the calcium oxide or calcium hydroxide is from about 0.05 to about 0.10 percent, based on the weight of the composition.

18. The method of claim 14 further comprising sodium hydroxide or sodium oxide.

19. The method of claim 14 further comprising a nitrogen-containing compound.

20. The method of claim 19 wherein the nitrogen-containing compound is from about 0.05 to about 2.0 percent, based on the weight of the composition.

* * * * *